(12) United States Patent
Okano et al.

(10) Patent No.: US 9,396,715 B2
(45) Date of Patent: Jul. 19, 2016

(54) TECHNIQUE FOR GENERATING AUDIO DATA FOR LOOP REPRODUCTION ON THE BASIS OF PERFORMANCE DATA

(71) Applicant: YAMAHA CORPORATION, Hamamatsu-shi, Shizuoka-ken (JP)

(72) Inventors: Tadashi Okano, Hamamatsu (JP); Takuma Yamazaki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 192 days.

(21) Appl. No.: 14/045,637

(22) Filed: Oct. 3, 2013

(65) Prior Publication Data
US 2014/0093105 A1 Apr. 3, 2014

(30) Foreign Application Priority Data
Oct. 3, 2012 (JP) .................................. 2012-221709

(51) Int. Cl.
*G10H 5/02* (2006.01)
*H04M 1/65* (2006.01)
*G10H 1/00* (2006.01)

(52) U.S. Cl.
CPC ............... *G10H 5/02* (2013.01); *G10H 1/0066* (2013.01); *H04M 1/65* (2013.01); *G10H 2250/641* (2013.01)

(58) Field of Classification Search
CPC ...... H04M 1/65; H04M 1/6515; H04M 1/652
USPC ........ 379/67.1, 68, 87, 72, 76, 77; 369/47.33; 84/605
See application file for complete search history.

(56) References Cited

U.S. PATENT DOCUMENTS 6,130,869 A * 10/2000 Tokoro .................... G06F 3/061
348/E5.008
6,535,772 B1 3/2003 Miyamori et al.

FOREIGN PATENT DOCUMENTS

JP 2000-338979 A 12/2000

OTHER PUBLICATIONS

Extended European Search Report dated Feb. 3, 2014, for EP Application No. EP 13186993.5, seven pages.
Horvath. (Oct. 13, 2010). "Making DAW out of Microsampler," Korg forums, <http://www.korgforums.com/forum/phpBB2/viewtopic.php?t=55884>, XP055098054, the whole document, three pages.

(Continued)

*Primary Examiner* — MD S Elahee
(74) *Attorney, Agent, or Firm* — Morrison & Foerster LLP

(57) ABSTRACT

A sequence of performance data to be loop-reproduced is read out repetitively for at least two cycles, and audio data repeating for at least two cycles are created on the basis of the read-out performance data. Audio data of a second or subsequent cycle of the created audio data have mixed therein a residual portion (release portion or reverberation portion) of a tone generated in a preceding cycle. The audio data of the second or subsequent cycle are stored as audio data for loop reproduction, and thus, the stored audio data for loop reproduction will include a residual portion of a tone generated in a preceding cycle. Thus, if the stored audio data for loop reproduction are reproduced repetitively, it is possible to achieve loop reproduction reflecting therein a residual portion of a tone generated in a preceding cycle.

13 Claims, 3 Drawing Sheets

(56) References Cited

OTHER PUBLICATIONS

Parfenov, S. (Oct. 12, 2010). "Making DAW out of Microsampler," http://www.youtube.com/watch?v=dzf1hQpyBNI <http://www.youtube.com/watch?v=dzf1hqpyBNI>, Retrieved on Jan. 23, 2014, the whole document, three pages.

Notice of Grounds for Rejection (Office Action) mailed Feb. 16, 2016, for JP Patent Application No. P2012-221709, with English translation, seven pages.

* cited by examiner

TECHNIQUE FOR GENERATING AUDIO DATA FOR LOOP REPRODUCTION ON THE BASIS OF PERFORMANCE DATA

BACKGROUND

The present invention relates to a technique for generating audio data for loop reproduction on the basis of a sequence of performance data, such as MIDI data.

Heretofore, there has been known a technique for creating an audio file capable of reproducing tones similar to tones reproduced on the basis of performance data, such as MIDI data, by converting the performance data into audio data (waveform data) and storing the converted audio data (see, for example, Japanese Patent Application Laid-open Publication No. 2000-338979 and U.S. Pat. No. 6,535,772B1 corresponding thereto). With such an audio file creation technique, it is possible to create, for example via a personal computer, audio data on the basis of performance data and allow the created audio data to be used on a desired audio player. Thus, using such a created audio data file, even an audio player capable of reproducing only audio data, for example, can reproduce tones based on the performance data, such as MIDI data, that by nature could not be reproduced on the audio player. Note that the term tones" as used in this specification is not limited to musical sound sounds but embraces voices and other types of sounds.

Further, recently, it has become possible to install in advance a music application software program, configured to implement predetermined music functions, in electronic equipment, such as a slate-type personal computer, smart phone or the like, so that the music application can operate on the electronic equipment. Thus, a user can enjoy using the electronic equipment not only as a mere reproduction apparatus (audio player) capable of reproducing tones but also as an electronic music apparatus having various music functions corresponding to the music application. One example of such a music application is known which is configured to allow a user to create a phrase performance as desired by repetitively reproducing (loop-reproducing) an audio file (commonly called a "tone template") comprising one or more prestored measures selected and arranged time-serially by the user. The aforementioned audio file creation technique can be used meaningfully in relation to such a music application. For example, using the aforementioned audio file creation technique, a sequence of performance data constituting a music piece or phrase is reproduced, and audio data obtained through the reproduction of the sequence of performance data are stored into a suitable memory as an audio file of the music piece or phrase. In the aforementioned music application, a user selects, as a looping portion, the stored audio data of a part of the music piece or whole or part of the phrase and causes the selected looping portion to be reproduced in a looped fashion or loop-reproduced.

For example, in a case where tones of a performance pattern having a four-measure length are to be reproduced repetitively (i.e., loop-reproduced) on the basis of a sequence of performance data of certain four measures, the tones of the four-measure performance pattern are audibly generated generally in such a manner that, at the time of reproduction of a first cycle of the loop, there occurs a silent state at the beginning and then audible tone generation starts with a first tone of the first measure and continues till the fourth measure. Then, at the time of reproduction of second and subsequent cycles of the loop, the tones of the same four-measure performance pattern are audibly generated repetitively; however, it is likely that there occurs no silent state at the beginning of the loop due to presence of a release portion or reverberation portion of a tone generated in the preceding cycle. Because, the tones based on the performance data are allocated to individual channels and audible generation of the tones is controlled independently among the tones, and thus, a tone whose audible generation has been started in a certain cycle of the loop (i.e., in a certain loop cycle) would get into a time region corresponding to the next loop cycle and continue sounding as a residual tone portion in that time region, regardless of the end of that cycle, depending on a control state of the release, reverberation or the like of the tone. Such mixing-in of the residual tone portion from the certain cycle to the next cycle during the loop-reproduction of the performance data would not necessarily give an unnatural feeling to a listener; rather, it would give a natural feeling to the listener.

However, with the prior art audio file creation technique, the aforementioned particular conditions involved in loop reproduction of a sequence of performance data are not taken into account. For example, the prior art audio file creation technique merely reproduces a sequence of performance data constituting a music piece or phrase and then stores audio data, obtained through the reproduction of the sequence of performance data, into a suitable memory as an audio file of the music piece or phrase. Thus, in a case where such audio data of a part of a music piece or the whole or a part of a phrase are selected as a looping portion and loop-reproduced, the selected looping portion is merely reproduced repetitively. Therefore, in each loop cycle, a residual tone portion from a preceding loop cycle would not mix into a beginning region of the loop cycle, so that an unnatural feeling would be given to a listener.

If the audio file created on the basis of the performance data according to the prior art technique is reproduced repetitively as above, tones that have not be influenced by a release portion or reverberation portion of a tone generated in the preceding cycle are generated per repetition, and thus, there would arise a problem that a user can't help but have an uncomfortable feeling. However, no technique for solving such a problem has been proposed yet.

SUMMARY OF THE INVENTION

In view of the foregoing prior art problems, it is an object of the present invention to provide an improved technique which, in loop reproduction of audio data created on the basis of performance data, permits loop reproduction reflecting therein a residual portion of a tone generated in a preceding cycle and thereby appropriately avoiding unnaturalness.

In order to accomplish the abovementioned object, the present invention provides an improved computer-implemented method for creating audio data for loop reproduction on the basis of performance data, which comprises: a readout step of reading out, repetitively for at least two cycles, a sequence of performance data to be loop-reproduced; a creation step of creating, on the basis of the performance data read out by the readout step, audio data repeating for at least two cycles; and a storage step of storing, as audio data for loop reproduction, the audio data of one cycle that is a second or subsequent cycle of the audio data repeating for at least two cycles created by the creation step.

According to the present invention, the sequence of performance data to be loop-reproduced is read out repetitively for at least two cycles so that audio data repeating for at least two cycles can be created on the basis of the read-out performance data. The audio data of the second or subsequent cycle of the created audio data have mixed therein a residual portion (release or reverberation portion) of a tone generated in a preceding cycle. The audio data of the second or subsequent cycle are stored as audio data for loop reproduction, and thus, the stored audio data for loop reproduction include a residual portion of a tone generated in a preceding cycle. Thus, if the stored audio data for loop reproduction are reproduced repetitively, it is possible to achieve loop reproduction reflecting therein a residual portion of a tone generated in a preceding cycle. The present invention can avoid the problem that generation of tones not influenced by a release portion or reverberation portion of a tone generated in a preceding loop cycle is undesirably repeated as encountered in the prior art, and thus, a user can use the created audio file to readily achieve reproduction of tones similar to tones obtained by repetitively reproducing the sequence of performance data.

A preferred embodiment of the method of the present invention further comprises a step of storing, as audio data for a first cycle of loop reproduction, audio data created on the basis of readout of a first cycle of the sequence of performance data to be loop-reproduced. Because there is no cycle preceding the first cycle, the audio data for the first cycle of loop reproduction has no influence of such a preceding cycle. Thus, by storing, as the audio data for the first cycle of loop reproduction, the audio data created on the basis of readout of the first cycle of the sequence of performance data, it is possible to obtain audio data suited as the first cycle of loop reproduction.

A preferred embodiment of the method of the present invention further comprises a loop reproduction step of loop-reproducing, as a set of audio data, the audio data for loop reproduction stored by the storage step and the audio data for the first cycle, and wherein, in accordance with a loop reproduction instruction, the loop reproduction step first reproduces the audio data for the first cycle for only one cycle and then reproduces the audio data for loop reproduction for one or more cycles. By performing the loop reproduction in the aforementioned manner, audio data most suited for the first cycle of loop reproduction (i.e., the above-mentioned audio data for the first cycle of loop reproduction) can be reproduced in the first cycle of loop reproduction, while audio data most suited for the second or subsequent cycle of loop reproduction (i.e., the above-mentioned audio data for loop reproduction) can be reproduced in the second or subsequent cycle of loop reproduction.

The present invention may be constructed and implemented not only as the method invention discussed above but also as a software program for execution by a processor, such as a computer or DSP, as well as a non-transitory computer-readable storage medium storing such a software program. Also, the present invention may be constructed and implemented as an apparatus invention.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
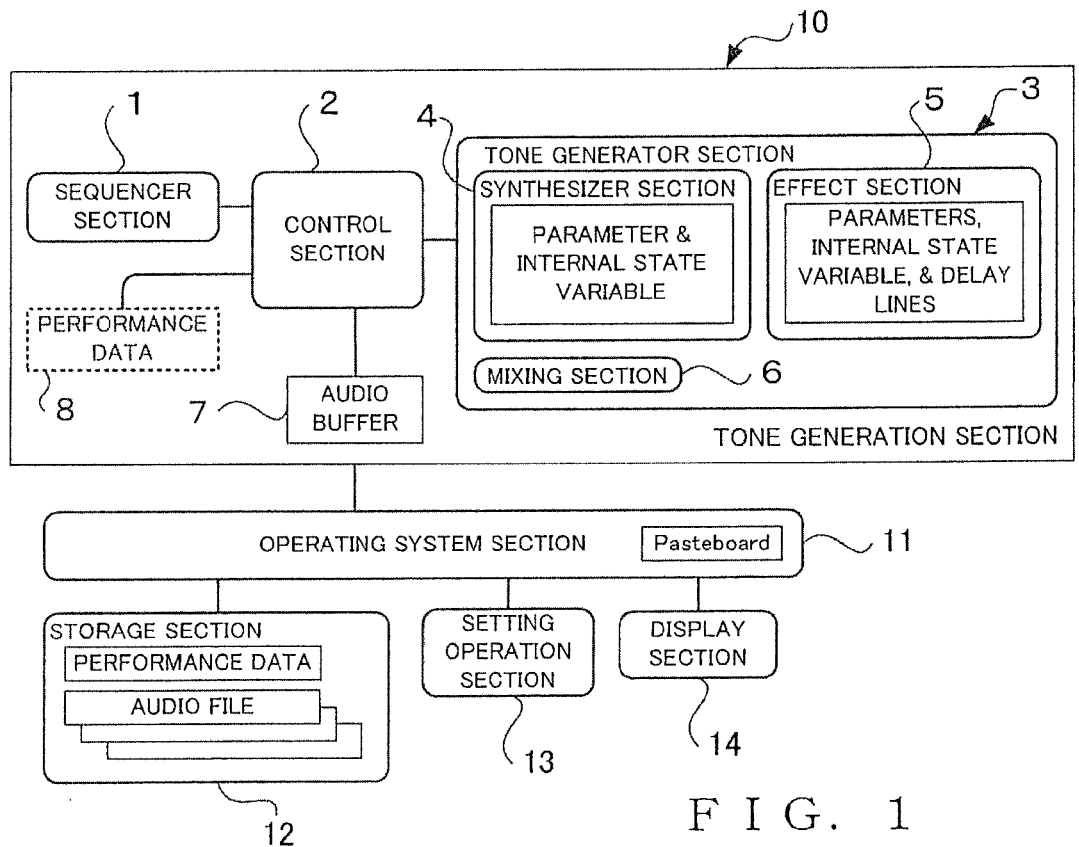
FIG. 1 is a functional block diagram of an embodiment of an audio file creation technique of the present invention.

FIG. 1 is a functional block diagram of electronic equipment constructed to be capable of executing a method or audio file creation program according to a preferred embodiment of the present invention. Note that the electronic equipment constructed to be capable of executing the audio file creation program may be constructed to also perform other functions in addition to those shown in FIG. 1. For example, the audio file creation program according to the embodiment of the present invention may be executed as one of various applications possessed by the electronic equipment. The electronic equipment includes as its principal hardware components: a computer section comprising a CPU, a ROM, a RAM, etc.; a memory section; a display section; a touch panel section; an audio output section; a network interface section, etc. Further, the electronic equipment may be implemented as any desired type of equipment, such as a portable phone, a portable music player, a portable personal computer, a portable information terminal, a desktop personal computer or the like. A block shown in FIG. 1 as a "tone generation section 10" implements various functions related to the audio file creation program according to the embodiment of the present invention.

The tone generation section 10 and an operating system section 11 are implemented by a program executable by a standalone computer comprising a not-shown CPU, RAM, RAM, etc. In the instant embodiment, activation and deactivation of the application software program (audio file creation program) implementing the tone generation section 10, write and read of various data to and from a storage section 12, various setting operations responsive to user operations via a setting operation section 13, display of various screens, such as a data listing screen (not shown), etc. are performed under control of the operating system section 11. Namely, the operating system section 11 monitors and controls overall behavior of the music equipment provided with the CPU, ROM, RAM, later-described storage section 12, operation setting section 13, display section 14, etc.

The storage section 12 stores therein performance data from which an audio file is to be created, various data, such as an audio file, generated on the basis of the performance data, various application software programs whose activation and deactivation is controlled by the operating system section 11, etc. The storage section 12 may be an external storage device, such as a hard disk (HD), or may be a storage device using any of detachable external storage media, such as a flexible disk (FD), compact disk (CD), magneto-optical disk (MO) and digital versatile disk (DVD). Alternatively, the storage section 12 may be a non-volatile semiconductor memory, such as a flash memory.

The performance data stored in the storage section 12 are sequences of data in each of which a plurality of pieces of performance information, each comprising a combination of tone generation start instruction data (note-on event data), tone generation end instruction data (note-off event data) and time data, such as a combination of MIDI data, are arranged over one or more measures in a performance progression order. Alternatively, the performance data stored in the storage section 12 may be sequences of data in each of which a plurality of pieces of performance information, each comprising a combination of information (such as unique file names) indicative of prestored audio files (tone templates) each having one to a plurality of measures and tone generation start times of the individual audio files. Such sequences of performance data may be ones created by a user or ones acquired from a not-shown electronic musical instrument or external equipment, such as a server apparatus, connected to the music equipment via a communication network, such as the Internet. Needless to say, the user can select, from among a multiplicity of sequences of performance data, any desired sequence of performance data from which create an audio file.

The setting operation section 13 includes virtual operators (or input elements) to which are assigned functions for implementing various control according to content displayed on the display section 14, for example, in response to execution of a predetermined application, and/or various physical operators, such as switches. The display section 14 is a touch-panel type display comprising, for example, a liquid crystal display panel (LCD) etc. Note that the display section 14 may be of any conventionally-known touch panel type and the liquid crystal display panel may be of any type, such as an electrostatic capacitance type, resistance film type, light-sensor-incorporated type or the like.

To the setting operation section 13 are allocated various functions, such as: a function for selecting a sequence of performance data, an audio file etc. stored in the storage section 12; a function for setting a tempo; a function for setting a name and loop length of an audio file to be created on the basis of performance data; a function for selecting a later-described file creation mode; a function for setting tone control parameters, like a tone pitch, a tone color, an effect (like a reverberation effect), etc.; a function for instructing a start of audio file creation; and a function for switching between software applications. Thus, in response to, for example, a user's touching operation on an operator (virtual operator) of the setting operation section 13, the setting operation 13 outputs, to the tone generation section 10, an instruction for performing control on a function corresponding to the user's operated operator and tone control parameters corresponding to the function, etc. The above-mentioned tempo is used not only for reproduction of tones on the basis of performance data but also for creation of an audio file. Namely, in creation of an audio file, progression of a virtual time to be used for audio data creation by a tone generator section 3 is determined on the basis of the tempo.

As shown in FIG. 1, the tone generation section 10 includes, as it principal components, a sequencer section 1, a control section 2, and the tone generator section 3 including a synthesizer section 4, an effect section 5 and a mixing section 6. In execution of the later-described audio file creation program (see FIG. 2), the sequencer section 1 functions to read out, repetitively for at least two cycles, a sequence of performance data to be loop-reproduced. More specifically, in accordance with an instruction from the control section 2, the sequencer section 1 advances or progresses a current position, determining a readout position of the performance data, by a later-described time, and, if the performance data 8 read out from the storage section 12 (i.e., performance data selected via the setting operation section 13 and temporarily stored in the RAM or the like) include event data (performance information), such as note-on and note-off event data, then the sequencer section 1 outputs the event data to the tone generator section 3.

In the instant embodiment, the above-mentioned predetermined time is a time length corresponding, for example, to 256 samples of audio data. Namely, the predetermined time is a time length of 256 samples according to a predetermined sampling frequency to be used in converting audio signals, sequentially generated on the basis of the performance data, into audio data. If the sampling frequency is, for example, "44.1 kHz", then the predetermined time is about 5.8 msec, which is proportional to a buffering size of an audio buffer 7 provided for transmission and reception of audio data. Namely, if the sampling frequency is, for example, "44.1 kHz", the audio buffer 7 has a buffering size capable of storing audio data corresponding to "about 5.8 msec" (i.e., 256 samples).

The tone generator section 3 functions to create, on the basis of the performance data read out from the sequencer section 1, audio data that repeat for at least two cycles. More specifically, in response to a request from the control section 2 and using empty channels, the tone generator section 3 creates 256 samples of audio data collectively within each short unit time on the basis of performance information sent from the sequencer section 1, and then the tone generator section 3 outputs, to the control section 2, the thus-created 256 samples of audio data without waiting for elapse of a predetermined actual time (i.e., the aforementioned predetermined time, such as about 5.8 msec). The tone generator section 3 includes, as its principal components, the synthesizer section 4, the effect section 5 and the mixing section 6. The synthesizer section 4, which is capable of simultaneously creating audio data in a plurality of channels, creates audio data corresponding to the predetermined time by use of the plurality of channels in response to a plurality of event data corresponding to the predetermined time being sent collectively from the sequencer section 1 and on the basis of the plurality of event data. At that time, the synthesizer section 4 creates the audio data by performing appropriate signal processing with reference to various preset parameters, internal state variables, etc. For example, in the instant embodiment, the synthesizer section 4 performs, as that signal processing, processing, such as one for controlling an envelope of a release portion of a tone, by which a succeeding tone too may be influenced. The thus-created audio data are output to the effect section 5. The tone generator section 3 may employ any desired tone synthesis method, such as the waveform memory method, FM method, physical model method, harmonics synthesis method, formant synthesis method or the like, singly or in a desired combination of these.

In accordance with event data input from the sequencer section 1 or event data input as necessary from the setting operation section 13, the effect section 5 performs control to impart any of various effects to audio data, created by the synthesizer section 4, with reference to various preset parameters, internal state variables, etc. In the instant embodiment, the effect section 5 imparts a reverberation effect, such as echo, using delay lines; namely, the effect section 5 imparts an effect of a type that can influence a succeeding tone as well. The effect-imparted audio data are output to a mixing section 6.

The mixing section 6 mixes together a plurality of audio data generated by the sequencer section 1 using the plurality of channels and effect-controlled by the effect section 5. The audio data thus mixed by the mixing section 6 are stored into the audio buffer 7 and then into an audio file. Of the audio data created on the basis of loop-reproduction of performance data (i.e., mixed audio data), although no influence of a release or reverberation portion (hereinafter referred to as "residual portion") of a preceding tone exists in a head or beginning portion of a first cycle of the loop reproduction (i.e., first loop cycle), it is likely that an influence of a residual portion of a preceding tone exists in a beginning portion of a second cycle of the loop reproduction (i.e., second loop cycle).

The control section 2 transmits as needed a signal requesting "256 samples of audio data" to the tone generator section 3, and temporarily stores the audio data sent from the tone generator section 3 into the audio buffer 7 in response to such a request. Namely, the 256 samples of audio data are temporarily stored into the audio buffer 7. Then, the control section 2 cumulatively stores the 256 samples of audio data, temporarily stored in the audio buffer 7, into an audio file provided in the storage section 12. Each time the 256 samples of audio data are transferred and stored from the audio buffer 7 into the audio file, the audio buffer 7 is cleared so that next 256 samples of audio data sent from the tone generator section 3 can be temporarily stored into the audio buffer 7. By series of such 256 samples of audio data output from the audio buffer 7 being cumulatively stored in succession into the audio file in the aforementioned manner, an audio file corresponding to a music piece can be created and stored in the storage section 12. The control section 2, the audio buffer 7 and the storage section 12 (more specifically, the audio file stored therein) function to store, as audio data for loop reproduction, audio data of one cycle that is a second or subsequent cycle of the audio data of (i.e., repeating for) at least two cycles created in the aforementioned manner.

As will be later described in particular relation to FIG. 3, the control section 2 performs control for storing, into an audio file, audio data created on the basis of readout of any one of first and second loop cycles of a sequence of performance data, depending on a selected file creation mode. In this manner, the control section 2 controls creation of audio data corresponding to performance data capable of being repetitively reproduced (i.e., loop-reproduced), depending on a selected file creation mode.

Note that the above-mentioned sequencer section 1, tone generator section 3, etc. may be implemented by other than a computer program, such as microprograms processed by a DSP (Digital Signal Processor). Alternatively, the sequencer section 1, tone generator section 3, etc. may be implemented as dedicated hardware devices including discrete circuits, integrated or large-scale integrated circuits, and/or the like.

Figure 2:
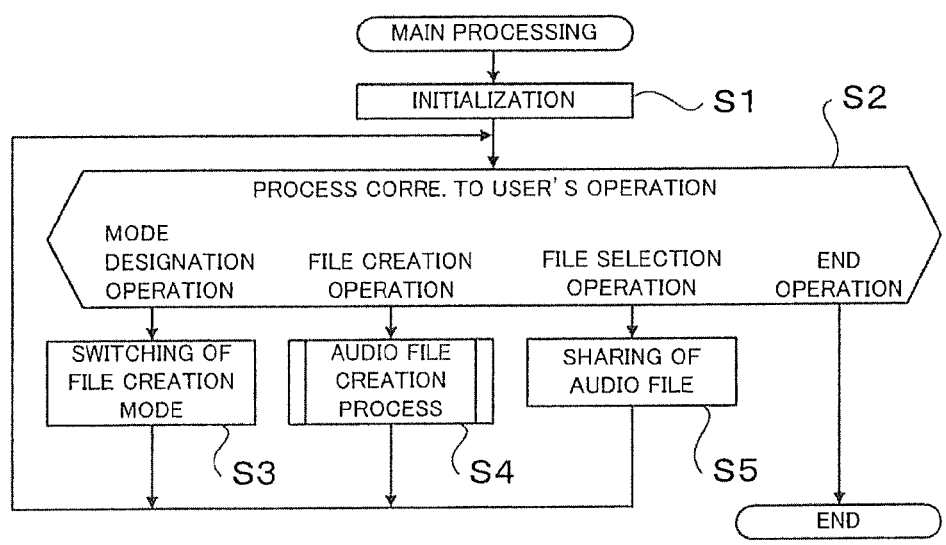
FIG. 2 is a flow chart showing an example operational sequence of main processing that implements a tone generation section shown in FIG. 1.

Next, with reference to FIG. 2, a description will be given about main processing for implementing the tone generation section 10 shown in FIG. 1. FIG. 2 is a flow chart showing an example operational sequence of the main processing. The main processing is started up, for example, in response to a user's operation for instructing execution of the audio file creation program.

At step S1, an initialization process is performed, where various parameters and internal state variables in the synthesizer section 4 and the effect section 5 are set at their respective predetermined initial values. More specifically, the delay lines of the effect section 5 are cleared of data and placed in a silent state, the audio file creation mode is set in a "first loop (1stLoop)" mode, and other initializing operations are performed in the initialization process. At next step S2, a determination is made as to what kind of operation a user's operation input via the setting operation section 13 is, and a process is performed depending on the kind of the input user's operation. Here, examples of such a user's operation include a file creation mode designation operation, a file creation operation, a file selection operation and an end operation; of course, other processes corresponding to other types of user's input operations may be performed.

If it has been determined at step S2 that the user's input operation is the file creation mode designation operation, switching of the file creation mode is effected at step S3. In the instant embodiment, the file creation mode can be switched between the "first loop (1stLoop)" mode and the "second loop (2ndLoop)" mode. Further, if it has been determined at step S2 that the user's input operation is the file creation operation, an audio file creation process is performed at step 4, as will be detailed later in relation to FIG. 3. Further, if it has been determined at step S2 that the user's input operation is the file selection operation, a process is performed at step S5 for sharing an audio file stored in the storage section 12. Furthermore, if it has been determined at step S2 that the user's input operation is the end operation, the main processing is brought to an end.

The following describe the process for sharing an audio file stored in the storage section 12. In the instant embodiment, the operating system section 11 (FIG. 1) permits switching to another application software program sharing a desired one of audio files stored in the storage section 12, while still keeping the audio file creation program (main processing) running or activated. In this case, a plurality of audio files stored in the storage section 12, each of which was for example sampled with a 44.01 kHz frequency and recorded in the Way format and Linear PCM format, are displayed on the display section 14 to allow the user to select any desired one of the displayed audio files. The audio file selected from among the displayed audio files by a user's touch operation is read out from the storage section 12 and copied to a buffer area (labeled "Pasteboard" in FIG. 1) provided in the operating system section 11. The above-mentioned other application software program reads out audio data from the audio file stored in the buffer area and uses the read-out audio data.

Among examples of the other application software program is one configured to be capable of sequentially reproducing, in accordance with the passage of time, a plurality of audio files time-serially arranged, for example, by a user. In this case, the other application software program may sometimes read out a same audio file repetitively for a plurality of cycles. Note that, for switching to the other application software program, it is only necessary to cause the other application software program to run on the foreground while still keeping the audio file creation program running on the background. Alternatively, switching to the other application software program may be effected by causing the other application software program to run after completely or temporarily deactivating the audio file creation program, in which case the audio file creation program may be caused to start running again from the beginning after the other application software program is deactivated, or may be caused to run again from the interrupted operating state.

Figure 3:
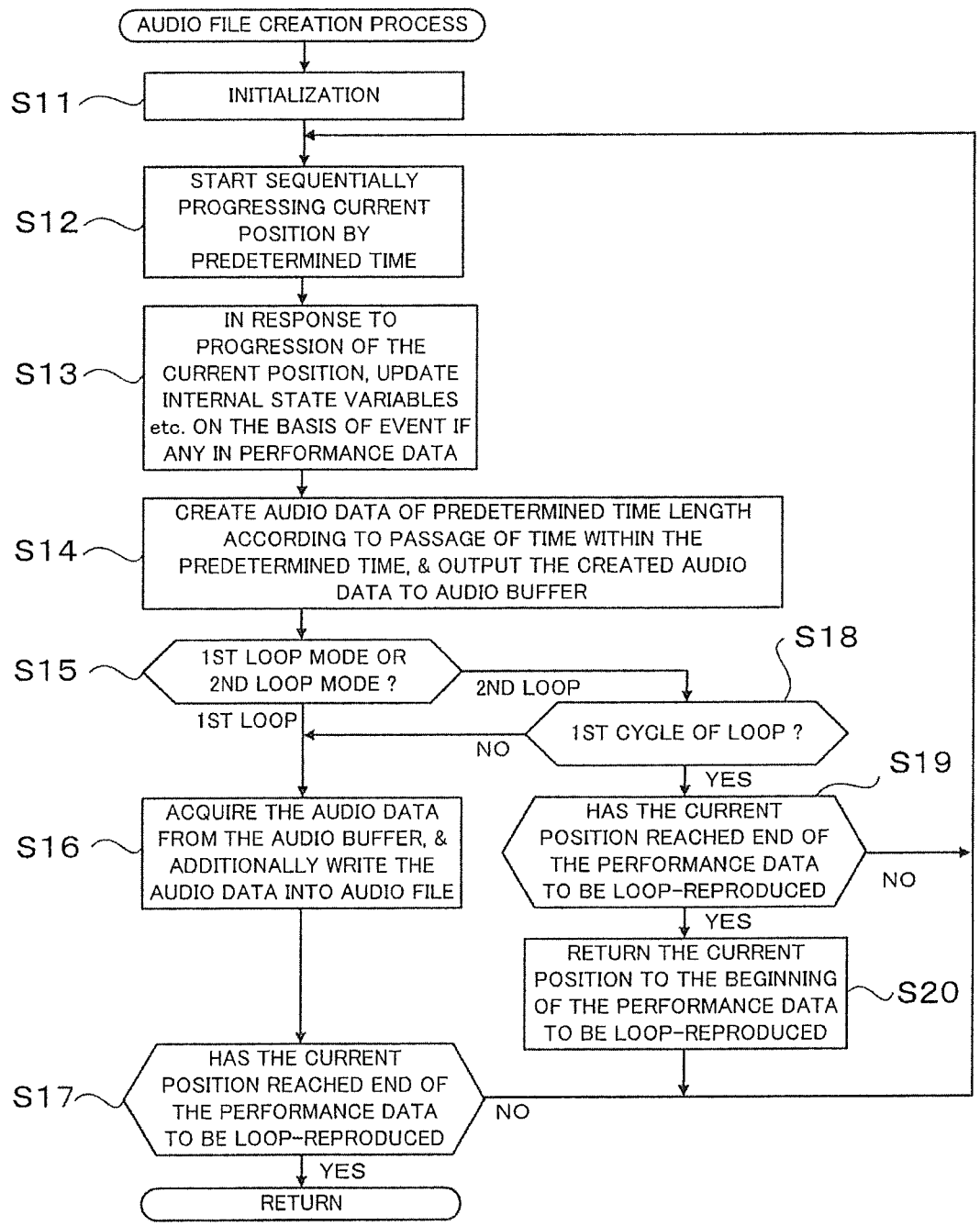
FIG. 3 is a flow chart showing an example operational sequence of an audio file creation process performed in the main processing shown in FIG. 3.

FIG. 3 is a flow chart showing an example operational sequence of the audio file creation process (see step S4 of FIG. 2). At step S11, an initialization process is performed, in which a tempo and a loop length (e.g., four-measure length, eight-measure length or sixteen-measure length) are designated or changed as desired, the current position is placed at the beginning of performance data, a file name of an audio file name is determined, and other necessary operations are performed. The audio file name may be determined by the user using a dialog or the like displayed on the display section 14.

At next step S12, an operation is started for sequentially and quickly progressing the current position by the above-mentioned predetermined time (corresponding to 256 samples). At step S13, if event data other than note-on or note-off event data exists at a position of the performance data corresponding to the sequentially-progressed current position, the control section 2 sends such event data to the tone generator section 3, so that the tone generator section 3 updates the parameters and internal state variables in the synthesizer section 4 and effect section 5 on the basis of the sent event data. Here, the current position is indicative of a temporal position of the performance data to be processed and sequentially progresses in a short time irrespective of the actual sampling time.

At step S14, if note-on or note-off event data exists at a position of the performance data corresponding to the sequentially-progressed current position, waveform data having an appropriate pitch and envelope are generated on the basis of the note-on or note-off event data, and consequently, audio data of a predetermined time length according to the passage of time within the predetermined time are created and output to the audio buffer 7. Namely, a signal requesting "256 samples of audio data" is sent from the control section 2 to the tone generator section 3, in response to which the tone generator section 3 creates 256 samples of audio data collectively in a short time and transmits the thus-created 256 samples of audio data to the control section 2. At that time, the tone generator section 3 creates such 256 samples of audio data in accordance with a progression of a quick virtual sampling time different from the actual sampling time and in accordance with the updated parameters and internal state variables in the synthesizer section 4 and the effect section 5. If the above-mentioned event data is note-off event data, the internal state variable in the synthesizer section 4 is changed from a note-on state to a note-off state. Thus, after that, each time the control section 3 requests audio data from the tone generator section 3, 256 samples of audio data fade-out-controlled such that the tone volume gradually lowers are sequentially created in accordance with the progression of the virtual sampling time. A waveform signal portion having been subjected to the fade-out control after the note-off will hereinafter be referred to a "residual portion".

At step S15, a determination is made as to whether the selected file creation mode is the "first loop (1stLoop)" mode or the "second loop (2ndLoop)" mode. If the selected file creation mode is the "first loop (1stLoop)" mode as determined at step S15, the audio data are acquired from the audio buffer 7 and additionally written into an audio file at step S16. At next step S17, a further determination is made as to whether the current position has reached the end of the performance data (i.e., end of the repetitively reproduced loop). If the current position has reached the end of the performance data as determined at step S17 (YES determination at step S17), the audio file creation process is brought to an end. If, on the other hand, the current position has not yet reached the end of the performance data (NO determination at step S17), the process reverts to step S12 to repeat the operations of steps S12 to S17. Thus, in the "first loop (1stLoop)" mode, audio data (audio data for a first cycle) created on the basis of readout of the first cycle of a loop (i.e., first loop cycle) of the sequence of performance data are stored into an audio file. The operation of step S16 performed in response to the YES determination of step S15 corresponds to storing, as the audio data for the first cycle, audio data of a first cycle created on the basis of reading out, for at least one loop cycle, the sequence of the performance data to be loop-reproduced.

If the selected file creation mode is the "second loop (2ndLoop)" mode as determined at step S15, a determination is made at step S18 as to whether the currently-reproduced performance data are based on readout of the first cycle of the loop reproduction. If the currently-reproduced performance data are based on readout of the first cycle of the loop reproduction (YES determination of step S18), a determination is made at step S19 as to whether the current position has reached the end of the performance data to be loop-reproduced (i.e., end of the repetitively reproduced loop). If the current position has not yet reached the end of the performance data to be loop-reproduced (NO determination of step S19), the process reverts to step S12. If the current position has reached the end of the performance data to be loop-reproduced (YES determination of step S19), the current position is returned back to the beginning of the performance data to be loop-reproduced at step S20, after which the audio file creation process reverts to steep S12. Further, if the currently-reproduced performance data are not based on readout of the first cycle of the loop reproduction (NO determination of step S18), then the process branches to step S16. Thus, in the "second loop (2ndLoop)" mode, audio data created on the basis of readout of the first cycle of the performance data to be loop-reproduced are discarded without being stored into an audio file, and audio data created on the basis of readout of the second cycle (second loop cycle) of the performance data to be loop-reproduced are stored into the audio file.

The operations of step S12 and S18 and S19 performed while the "second loop" mode is selected correspond to repetitively reading out the sequence of the performance data to be loop-reproduced for at least two cycles. Further, the operations of step S14 and S18 and S19 performed while the "second loop" mode is selected correspond to creating, on the basis of the read-out performance data, audio data that repeat for at least two cycles. Further, the operation of step S16 performed in response to the NO determination at step S18 while the "second loop" mode is selected correspond to storing, as audio data for loop reproduction, audio data of one cycle that is the second or subsequent cycle of the created audio data repeating for at least two cycles.

Figure 4:
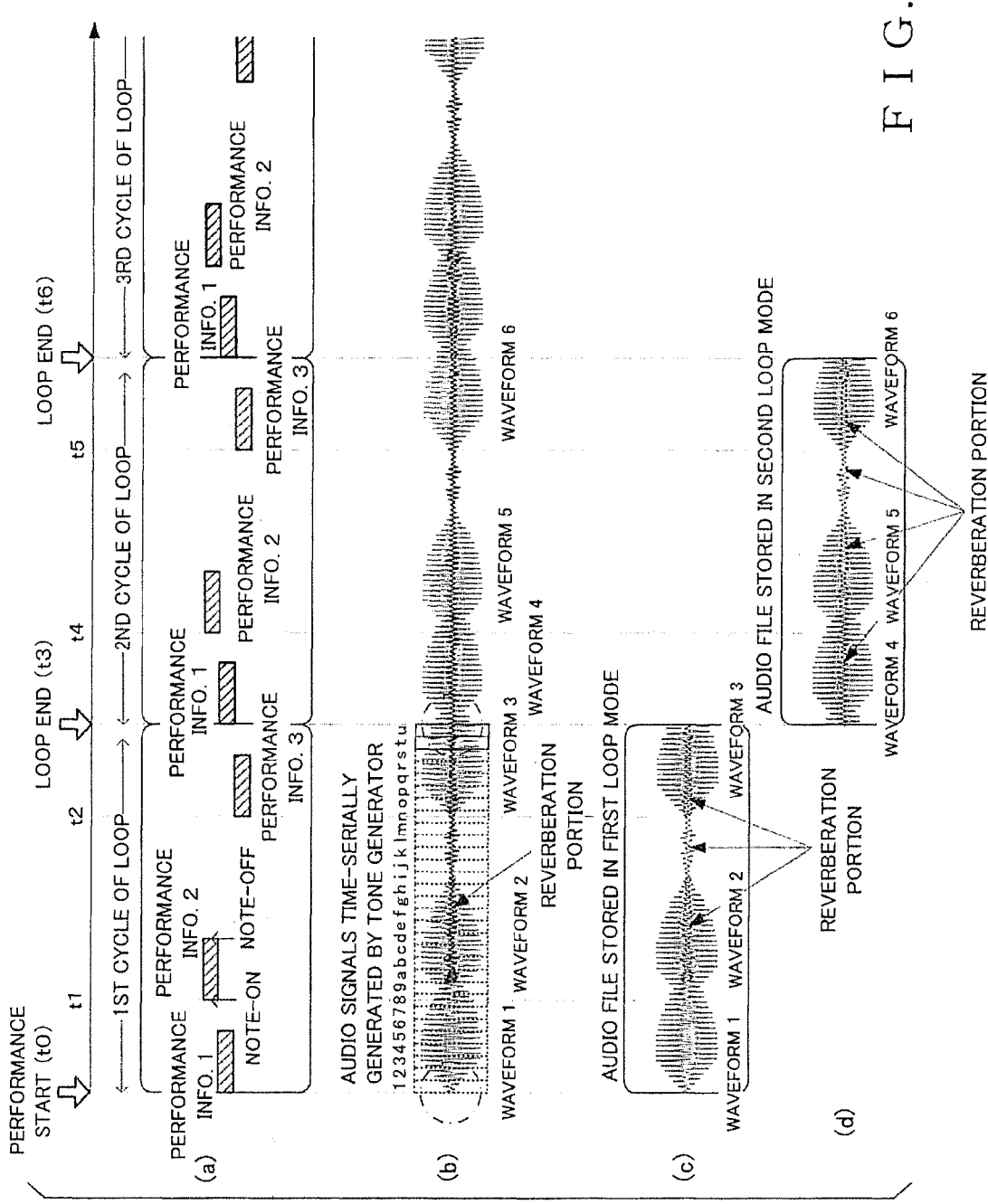
FIG. 4 is a time chart explanatory of the operational sequence of the audio file creation.

FIG. 4 is a time chart explanatory of the operational sequence of the audio file creation in the instant embodiment. FIG. 4 shows, from top to down, (a) performance data, (b) audio data created on the basis of the performance data, (c) an audio file created in the "first loop (1 stLoop)" mode, and (d) an audio file created in the "second loop (2ndLoop)" mode. Note however, for ease of description, the audio data are depicted here as audio signal waveforms. Further, the illustrated example will be described in relation to a case where performance data comprising performance information 1 to 3, comprising combinations of note-on events each instructing a start of a performance of a tone and note-off events each instructing an end of a performance of a tone, are included in one loop and such performance data within the one loop are read out repetitively. In the figure, t0 and t3 indicate start and end times, respectively, of the first cycle of the loop reproduction, and t3 and t6 indicate start and end times, respectively, of the second cycle of the loop reproduction.

The following first describe a case where the selected file creation mode is the "first loop (1stLoop)" mode. Once readout of the first cycle of the performance data is started at time t0, performance information 1 to 3 is sequentially read out, so that audio data including waveforms 1 to 3 are ultimately created as shown in the first loop cycle of the loop reproduction in (b) of FIG. 4. Note, however, that, in the illustrated example, waveform 2 includes a residual portion of waveform 1 and waveform 3 includes a residual portion of at least one of waveform 1 and waveform 2. An audio file is created on the basis of audio data of waveform 1, and waveforms 2 and 3 having residual portions of their respective preceding waveforms. As noted above, in creating such an audio file, operations for creating audio data of a predetermined time length (corresponding to 256 samples) in accordance with the progression of the current position and storing the thus-created audio data into an audio file are repeated until the readout of one cycle ends, i.e. till the end t3 of the loop.

In FIG. 4, the first waveform, i.e. waveform 1, comprises audio data of a plurality of segments 1 to 8. The audio data of each of the segments comprise audio data of a predetermined time length corresponding to 256 samples (see a broken-line rectangle in (b) of FIG. 4). As the audio data of segments 1 to 8, each having the predetermined time length, are created, the audio data of segments 1 to 8 are sequentially (cumulatively) stored, 256 samples by 256 samples, into an audio file. Similarly, next waveform 2 comprises audio data of a plurality of segments 8 to n each having the predetermined time length as indicated in (b) of 4. Note, however, at least some of segments 8 to n includes a residual portion of preceding waveform 1. As the audio data of segments 8 to n are created, the audio data of segments 8 to n are sequentially (cumulatively) stored, 256 samples by 256 samples, into the audio file. Similarly, next waveform 3 comprises audio data of a plurality of segments n to u each having the predetermined time length as indicated in (b) of FIG. 4. At least some of segments n to u includes a residual portion of preceding waveform 2. As the audio data of segments n to u are created, the audio data of segments n to u are sequentially (cumulatively) stored, 256 samples by 256 samples, into the audio file.

Namely, when the selected file creation mode is the "first loop" mode, the audio data of the plurality of segments, i.e., segments 1 to n, reproduced on the basis of readout of the first loop cycle of the performance data to be loop-reproduced are stored into the audio file in the storage section 3 (see (c) FIG. 4). Note that, in the "first loop (1 stLoop)" mode, it is not necessary to read out the second loop cycle of the performance data.

Further, when the selected file creation mode is the "second loop (2ndLoop)" mode, readout of the second loop cycle of the performance data is started at time t3 following the readout of the first loop cycle of the performance data. Then, again, performance information 1 to 3 is sequentially read out from the performance data, on the basis of which audio data of waveforms 4 to 6 are sequentially created as shown in (b) of FIG. 4. It is likely that the audio data of waveform 4 include a residual portion of at least one of preceding waveforms 1 to 3, that the audio data of waveform 5 include a residual portion of at least one of preceding waveforms 1 to 4, and that the audio data of waveform 6 include a residual portion of at least one of preceding waveforms 1 to 5. Namely, in the loop reproduction of the performance data, it is very likely that a given loop cycle is started although a generation process of a residual portion of a tone (e.g., waveform 3) generated in a preceding loop cycle is still being continued and hence that a tone (e.g., waveform 4) to be generated in the started given loop cycle and the residual portion are generated overlappingly. Due to presence of such a residual portion, the audio data based on the readout of the second loop cycle of the performance data will have a different characteristic from the audio data based on the readout of the first loop cycle that do not have such a residual portion (see a portion encircled by dashed-dotted line in (b) of FIG. 4). In the "second loop (2ndLoop)" mode, the audio data based on the readout of the second loop cycle having such a characteristic are stored into an audio file. Namely, when the selected file creation mode is the "second loop" mode, the audio data of a plurality of segments (each having the predetermined time length), created based on readout of the second loop cycle of the performance data, are sequentially stored into an audio file (see (d) of FIG. 4), without the audio data of segments 1 to u, created based on readout of the first loop cycle of the performance data being stored into an audio file. In this case, because necessary audio data for loop reproduction can be obtained on the basis of reading out the performance data (MIDI data) for the minimum two cycles, it is not necessary to read out the performance data for the third loop cycle at time t6.

The audio data created and stored in the audio file in accordance with the "first loop" mode can be loop-reproduced by a suitable audio player. Such audio data created in the "first loop" mode are loop-reproduced with no residual portion of a tone, reproduced in a preceding loop cycle, existing therein (or with such a residual portion cut out therefrom). As apparent, loop-reproducing only the audio data created in the "first loop" mode is a conventionally-known technique. Because no residual portion of a tone reproduced in a preceding loop cycle exists, the loop reproduction of the audio data would lack naturalness.

The audio data created and stored in the audio file in accordance with the "second loop" mode, on the other hand, can also be loop-reproduced by a suitable audio player. Such audio data created in the "second loop" mode are loop-reproduced with a residual portion of a tone, reproduced in a preceding loop cycle, existing therein, it is possible to achieve loop reproduction of the audio data with a more natural feeling.

Needless to say, the audio data created in accordance with the "first loop (1 stLoop)" mode and in accordance with the "second loop (2ndLoop)" mode on the basis of the same performance data can be loop-reproduced as a set or in combination. For example, the audio data created in accordance with the "first loop" and in accordance with the "second loop" mode on the basis of the same performance data may be stored as a set in an audio file so that, in response to a user's instruction for loop reproducing the audio file, the audio data created in accordance with the "first loop" mode are reproduced only for one cycle and then the audio data created in accordance with the "second loop" mode are reproduced repetitively. Such an arrangement can achieve loop reproduction with an even more natural feeling.

According to the above-described embodiment, when the selected file creation mode is the "second loop (2ndLoop)" mode, the performance data are read out repetitively for at least two or more cycles. Then, the audio data of the plurality of segments, each having the predetermined time length, created on the basis of readout of the second or subsequent cycle of the performance data are sequentially stored into an audio file, to thereby create an audio file for reproduction of one cycle corresponding to the performance data and capable of reproducing tones that are sequentially reproduced on the basis of the performance data. By repetitively reproducing the audio file created in the aforementioned manner, it is possible to generate tones that are influenced, per repetition cycle (loop cycle) of the audio file, by a release portion or reverberation portion of a tone reproduced in a preceding loop cycle. Thus, the instant embodiment can avoid the problem that generation of tones not influenced by a release portion or reverberation portion (residual portion) of a tone generated in a preceding loop cycle is undesirably repeated as encountered in the prior art, and thus, a user can use a created audio file to readily achieve reproduction of tones similar to tones obtained by repetitively reproducing a sequence of performance data.

Further, in response to a file creation mode switching operation, the instant embodiment permits switching between the "first loop (1stLoop)" mode in which audio data created on the basis of readout of the first loop cycle of performance data are stored to create an audio file for reproduction of one cycle and the "second loop (2ndLoop)" mode in which audio data created on the basis of readout of the second or subsequent loop cycle of the performance data are stored to create an audio file for reproduction of one cycle. In this way, by using any one of the created audio files as needed, the user is allowed to generate desired tones without any uncomfortable feeling being caused by connection between tones.

Whereas the preferred embodiment of the present invention has been described above with reference to the accompanying drawings, the present invention is of course not limited to the above-described embodiment, and various other embodiments and modifications are also possible. For example, the present invention is not limited to application to electronic equipment, such as slate-type personal computers and smart phones, and the present invention is also applicable to electronic musical instruments comprising an ordinary personal computer and dedicated hardware.

Further, whereas the preferred embodiment has been described above as creating audio data in accordance with the "second loop (2ndLoop)" mode at the time of the second cycle of loop readout of performance data as shown in (d) of FIG. 4, the present invention is not so limited, and arrangements may be made for creating audio data in accordance with the "second loop" mode at the time of the third or subsequent cycle of loop readout of performance data. In such a case, in response to a user variously operating the setting operation section 12 to various adjust a time length of a release portion and impart different reverberation effects, a variety of audio data for loop reproduction can be created on a trial-and-error basis, so that particular audio data favored by the user from among the created audio data can be stored into an audio file with an increased ease. For that purpose, an arrangement is made for allowing the user to give a write instruction at desired timing when the selected audio file creation mode is for example the "second loop (2ndLoop)" mode. In such a case, step S18 of FIG. 4 is modified so as to make a determination as to whether the currently-reproduced performance data are based on readout of a "loop cycle before the write instruction". More specifically, an arrangement may be made such that, if the currently-reproduced performance data are based on readout of a loop cycle before the user's write instruction, a YES determination is made at step S18, and then, the determination at step S18 changes to "NO" at the beginning of the first loop cycle immediately following the user's write instruction.

Furthermore, whereas the preferred embodiment has been described as executing the "first loop" mode or the "second loop" mode in response to selection by the user, switching between the "first loop" mode and the "second loop" mode may be effected automatically. Namely, after audio data repeating for two or more cycles are created by reading out performance data repetitively for two or more cycles, the first cycle of the audio data may be automatically set to the "first loop" mode and the second or subsequent cycle may be automatically set to the "second loop" mode.

Note that the above-described audio file creation program may also have a performance data reproduction function, i.e. a function for generating tones in response to reproduction of performance data. More specifically, in reproduction of the performance data, audio data having a predetermined time length are created repetitively in generally the same manner as in the above-described audio file creation process, during which time the current position for reading out performance information from the performance data is progressed in accordance with sampling clock pulses managed by the operating system section 11. Namely, the predetermined time length (256 samples or about 5.8 msec) of the actual sampling time is measured using the sampling clock pulses managed by the operating system section 11, and the current position is progressed at intervals of the measured time, in response to each which the tone generator section 3 creates audio data of the predetermined time length (256 samples). Further, in this case, the audio data of the predetermined time length are output to a not-shown sound system managed by the operating system section 11, instead of being output via the audio buffer 7 to an audio file in the storage section 12. The sound system takes out samples of the received audio data of the predetermined time length (256 samples), one sample per sampling clock pulse, and then converts the taken-out samples from digital representation to analog representation for sounding or audible generation via a speaker.

In the above-described embodiment, because the progression of the current position for reading out performance information from performance data is controlled by the virtual sampling time, corresponding to clock pulses proportional to the processing capability of the CPU, so that the current position is not limited to the actual sampling time, an audio file can be created with an increased efficiency. However, the present invention is not so limited, and the progression of the current position may be controlled by the actual sampling time corresponding to the sampling clock pulses, managed by the operating system section 11, as with the above-described performance data reproduction function. In such a case, it should be noted that creating, for example, an audio file corresponding to tones of ten seconds reproduced on the basis of performance data takes a time of 10 seconds in the "first loop" mode, but takes a time of 20 seconds in the "second loop" mode. However, in such a case, the present invention can advantageously create an audio file while audibly generating tones, by setting, as output destinations of the audio data, both an audio file in the storage section 12 and the not-shown sound system.

This application is based on, and claims priority to, JP PA 2012-221709 filed on 3 Oct. 2012. The disclosure of the priority application, in its entirety, including the drawings, claims, and the specification thereof, are incorporated herein by reference.

What is claimed is:

1. A processor-implemented method for creating audio data for loop reproduction on the basis of performance data, said method comprising:
   reading out by a processor, repetitively for at least two cycles, a sequence of performance data to be loop-reproduced;
   creating by said processor, on the basis of the performance data read out by said reading out, audio data repeating for at least two cycles; and
   storing by said processor, into a non-transitory storage medium as audio data for loop reproduction, the audio data of one cycle that is a second or subsequent cycle of said audio data repeating for at least two cycles created by said creating,
   wherein said audio data of the second or subsequent cycle, stored by said storing in said non-transitory storage medium, includes a residual portion of a tone generated in a cycle preceding the second or subsequent cycle.

2. The processor-implemented method as claimed in claim 1, which further comprises:
   storing by said processor, into said non-transitory storage medium as audio data for a first cycle of loop reproduction, audio data created on the basis of readout of a first cycle of the sequence of performance data to be loop-reproduced.

3. The processor-implemented method as claimed in claim 2, which further comprises:

loop-reproducing by said processor, as a set of audio data, the audio data for loop reproduction stored by said storing and the audio data for the first cycle, and wherein, in accordance with a loop reproduction instruction, said loop-reproducing first reproduces the audio data for the first cycle for only one cycle and then reproduces the audio data for loop reproduction for one or more cycles.

4. The processor-implemented method as claimed in claim 1, wherein said creating allocates one or more tones, designated by the read-out performance data, to different channels to thereby generate the designated tones in the channels independently of each other, wherein said creating the audio data includes mixing the generated tones.

5. A non-transitory computer-readable medium storing a program executable by a processor to execute a method for creating audio data for loop reproduction on the basis of performance data, said method comprising:

reading out by said processor, repetitively for at least two cycles, a sequence of performance data to be loop-reproduced;

creating by said processor, on the basis of the performance data read out by said reading out, audio data repeating for at least two cycles; and storing by said processor, into a non-transitory storage medium as audio data for loop reproduction, the audio data of one cycle that is a second or subsequent cycle of said audio data repeating for at least two cycles created by said creating, wherein said audio data of the second or subsequent cycle, stored by said storing in said non-transitory storage medium, includes a residual portion of a tone generated in a cycle preceding the second or subsequent cycle.

6. The computer-readable medium as claimed in claim 5, the method further comprising:

storing by said processor, into said non-transitory storage medium as audio data for a first cycle of loop reproduction, audio data created on the basis of readout of a first cycle of the sequence of performance data to be loop-reproduced.

7. The computer-readable medium as claimed in claim 6, the method further comprising:

loop-reproducing by said processor, as a set of audio data, the audio data for loop reproduction stored by said storing and the audio data for the first cycle, and wherein, in accordance with a loop reproduction instruction, said loop-reproducing first reproduces the audio data for the first cycle for only one cycle and then reproduces the audio data for loop reproduction for one or more cycles.

8. The computer-readable medium as claimed in claim 5, wherein said creating allocates one or more tones, designated by the read-out performance data, to different channels to thereby generate the designated tones in the channels independently of each other, wherein said creating the audio data includes mixing the generated tones.

9. An apparatus for creating audio data for loop reproduction on the basis of performance data, said apparatus comprising:

a non-transitory storage medium; and
a processor configured to:
read out, repetitively for at least two cycles, a sequence of performance data to be loop-reproduced;
create, on the basis of the read-out performance data, audio data repeating for at least two cycles; and
store, into said non-transitory storage medium as audio data for loop reproduction, the audio data of one cycle that is a second or subsequent cycle of the created audio data repeating for at least two cycles, wherein said audio data of the second or subsequent cycle, stored in said non-transitory storage medium, includes a residual portion of a tone generated in a cycle preceding the second or subsequent cycle.

10. The apparatus as claimed in claim 9, wherein said processor is further configured to:

store into said non-transitory storage medium, as audio data for a first cycle of loop reproduction, audio data created on the basis of readout of a first cycle of the sequence of performance data to be loop-reproduced.

11. The apparatus as claimed in claim 10, wherein said processor is further configured to:

loop-reproduce, as a set of audio data, the stored audio data and the audio data for the first cycle, and
wherein, in accordance with a loop reproduction instruction, said processor first reproduces the audio data for the first cycle for only one cycle and then reproduces the audio data for loop reproduction for one or more cycles.

12. The apparatus as claimed in claim 9, wherein said processor is further configured to:

allocate one or more tones, designated by the read-out performance data, to different channels to thereby generate the designated tones in the channels independently of each other, said processor creating the audio data by mixing the generated tones.

13. An apparatus for creating, on the basis of performance data, audio data for loop reproduction, said apparatus comprising:

sequencer circuitry configured to read out, repetitively for at least two cycles, a sequence of performance data to be loop-reproduced;

tone generator circuitry configured to create, on the basis of the performance data read out by said sequencer circuitry, audio data repeating for at least two cycles; and a non-transitory storage medium configured to store, as audio data for loop reproduction, the audio data of one cycle that is a second or subsequent cycle of said audio data repeating at least two cycles and created by said tone generator circuitry, wherein said audio data of the second or subsequent cycle, stored in said non-transitory storage medium, includes a residual portion of a tone generated in a cycle preceding the second or subsequent cycle.

* * * * *